Patented Feb. 9, 1954

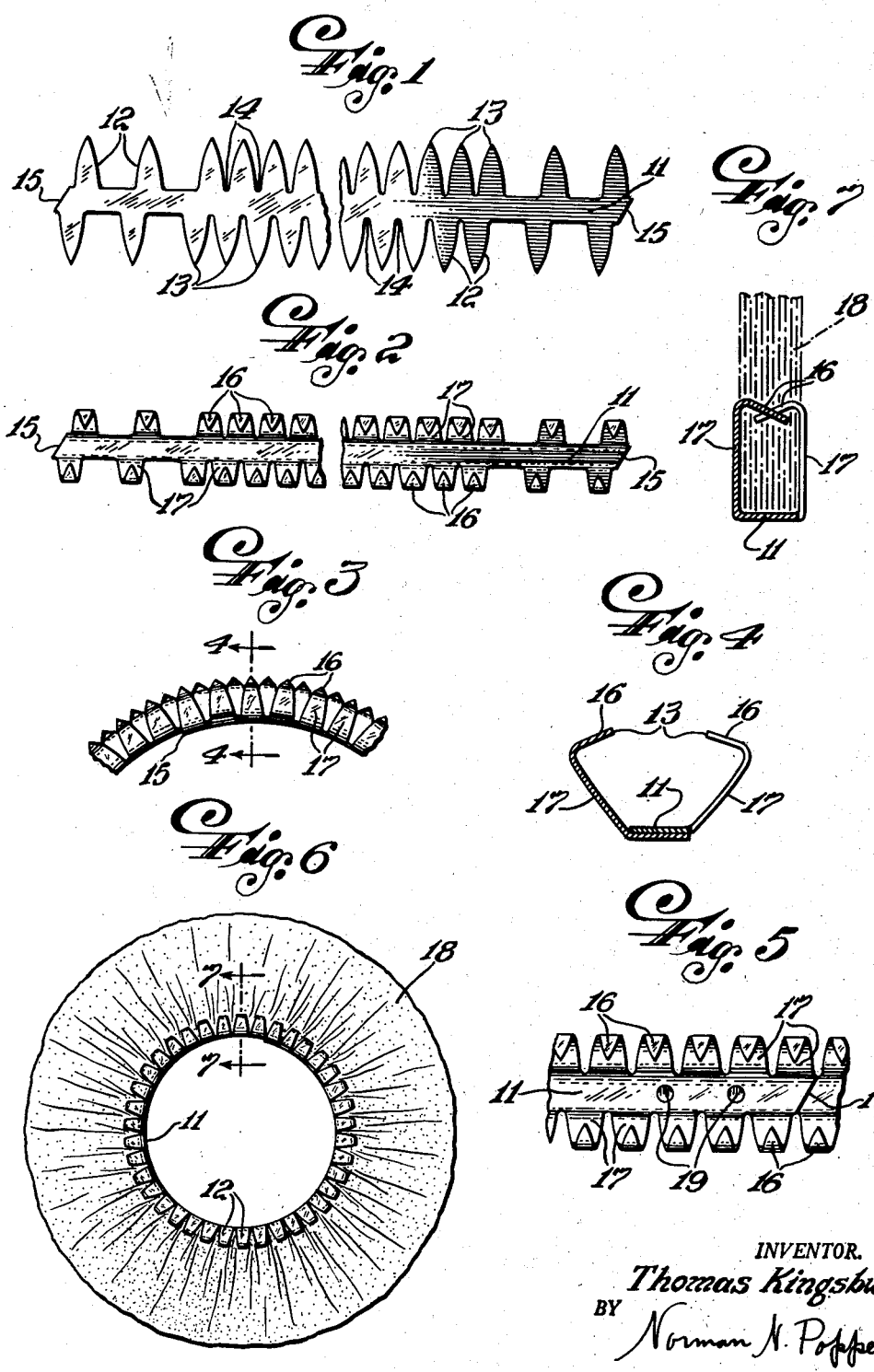

2,668,399

UNITED STATES PATENT OFFICE 2,668,399

CLINCH RING

Thomas Kingsbury, Grayslake, Ill., assignor to Leonard B. Sax, Glencoe, Ill.

Application July 2, 1951, Serial No. 234,890

2 Claims. (Cl. 51—193)

My invention relates to clinch rings and specifically to clinch rings having interlocking ends.

It is among the objects of my invention to provide a clinch ring having its ends held together by mechanical means.

Among the further objects of my invention is to provide a clinch ring which does not depend for its strength on ends welded together.

A still further object of my invention is to provide a clinch ring whose strength is not impaired by a welded connection of its ends.

Yet another object of my invention is to provide a clinch ring, the ends of which are connected together by alternate interlocking teeth.

Among the further objects of my invention is to provide a clinch ring of greater durability and strength.

These objects and advantages, as well as other objects and advantages, may be obtained by the device illustrated in the appended drawings, in which:

Figure 1 is a top view of a band from which the clinch ring may be formed;

Figure 2 is a top view showing the band with the teeth bent;

Figure 3 is a partial side view showing the clinch ring formed from overlapping the ends of the band;

Figure 4 is a cross-section of the clinch ring taken on the line 4—4 in Figure 3;

Figure 5 is a top view of the clinch ring;

Figure 6 is a side view of the clinch ring deformed to engage the buffing fabric; and Figure 7 is a cross-sectional view taken on the line 7—7 in Figure 6 showing the clinch ring with the teeth disposed in clamping position.

Referring now to the drawings in detail, my clinch ring is in the form of a band 11. Teeth 12 integral with the band 11, extend from its sides. These teeth 12 are substantially triangular in form as may be seen in figure 1, and are disposed on opposite sides of the band in staggered relationship, that is to say, the apex 13 of each tooth 12 is opposite to one end 14 of the base of the opposite teeth. The ends 15 of the band are not perpendicular to the longitudinal axis of the band, but are angularly disposed thereto, running from the side of one tooth 12 to the side of the opposite staggered tooth 12. The ends 16 of the teeth 12 are bent inwardly (see Figure 4), prior to the insertion of the buffing fabric, and the body 17 of each tooth 12 is bent slightly upward.

For a distance of possibly four teeth on each side of the band 11 and at each end thereof, alternate teeth are cut-off close to the point where the teeth 12 extend from the band. And on the opposite side of the band, the corresponding tooth 12 is cut-off. Thus the second and fourth teeth on each side of the band and at each end thereof are cut-off. The ends 15 of the band are then overlapped so that the position of each cut-off tooth on one end of the band is occupied by a remaining tooth 12 on the other end of the band.

The ends of the band 11 are now lightly connected by spot welds 19. Of course the ends may be fastened together by any other means. The connection between them need not be so strong as to be able to bear the stresses of actual usage. Such strains and stresses will be substantially borne by the interlock of the teeth 12 at the ends 15 of the band, when they are clamped on the fabric, as hereinafter set forth. The weld is merely for the purpose of holding the ends 15 together during assembly. The use of greater heat in welding than is necessary to form such a light connection, has been found to crystallize or impair the temper of the band 11 in other forms of clinch rings, thereby contributing to their rapid disintegration under conditions of actual usage. Since a strong unbreakable weld spot is not required, in the present clinch ring, the original temper and strength of the clinch ring is preserved. A buffing fabric is now inserted between the teeth 12 in any desired manner. Pressure is then applied to the teeth 12 to deform them inwardly until the body 17 of each tooth 12 is substantially perpendicular to the band 11 and the ends 15 engage the buffing fabric 18. It is then that the teeth 12 at the ends 15 of the band 11 assume an interlocking relationship. The teeth 12 from one end 15 of the band 11 will underlie the overlapped opposite end 15 of the band 11 and will occupy the gaps in which the cut-off teeth would have stood. A strong interlock of the ends 15 is thereby formed due to the alternate positioning at the ends of the band 11 of teeth from both its top and bottom ends 15. The strength of this interlock is independent of the welds 19.

It will, therefore, be seen that I have provided a clinch ring whose great strength and durability during actual conditions of operation is quite independent of the fact that the ends of the band forming the ring are fastened together, but resides principally in the interlocking arrangement of the clinching teeth.

While I have detailed the cutting off of corresponding opposite teeth on either side of both ends of the band 11, it is readily understood that other equivalent constructions may be resorted to, such as cutting off the odd numbered teeth on one side of the band and the even numbered teeth on the opposite side of the band and then overlapping the ends so that the gaps will be filled by the remaining teeth.

The foregoing description is merely intended to illustrate an embodiment of the invention. The component parts have been shown and described. They each may have substitutes which may perform a substantially similar function; such substitutes may be known as proper substitutes for the said components and may have actually been known or invented before the present invention; these substitutes are contemplated as being within the scope of the appended claims, although they are not specifically catalogued herein.

I claim:

1. A clinch ring comprising an elongated strip, a plurality of teeth on both sides of the strip arranged in contiguity with each other and the teeth at each end of the strip separated from each other by a space substantially that of a tooth, the ends of the strip attached together in overlapping relation with the teeth on one end of the strip disposed in the spaces between the teeth on the other end of the strip, said teeth being disposed perpendicular to the strip on both sides thereof and in the same plane with each other and having their ends disposed inwardly to engage a buffing means.

2. A clinch ring comprising an elongated strip, uniform teeth formed on both sides of the strip in staggered relation to each other and said teeth being arranged in contiguity on the strip except at the ends where alternate opposite spaces replace teeth on both sides of the strip, the ends of the strip attached together in overlapping relation with the teeth on one end of the strip disposed in the spaces between the teeth on the other end of the strip and the spaces on the one end being filled with the teeth on the other end, said teeth being bent perpendicular to the strip on both sides thereof and in the same plane with each other, and having their ends disposed inwardly to engage a buffing means, whereby the alternately disposed teeth from both ends of the strip disposed in the same plane on each side of the strip cooperatively engage with the adjacent tooth to form an interlock of the ends of the strip.

THOMAS KINGSBURY.

References Cited in the file of this patent

UNITED STATES PATENTS

| Number | Name | Date |
|---|---|---|
| 2,035,351 | Taylor | Mar. 24, 1935 |
| 2,140,208 | Murray | Dec. 13, 1938 |
| 2,291,524 | Best et al. | July 28, 1942 |
| 2,452,839 | Coyle et al. | Nov. 2, 1948 |
| 2,455,098 | Seelenfreund | Nov. 30, 1948 |
| 2,539,844 | Kingsbury | Jan. 30, 1951 |